Aug. 15, 1961  D. BROIDA ET AL  2,996,436
PROCESS FOR THE COLORIMETRIC DETERMINATION OF
LACTIC DEHYDROGENASE
Filed June 2, 1958
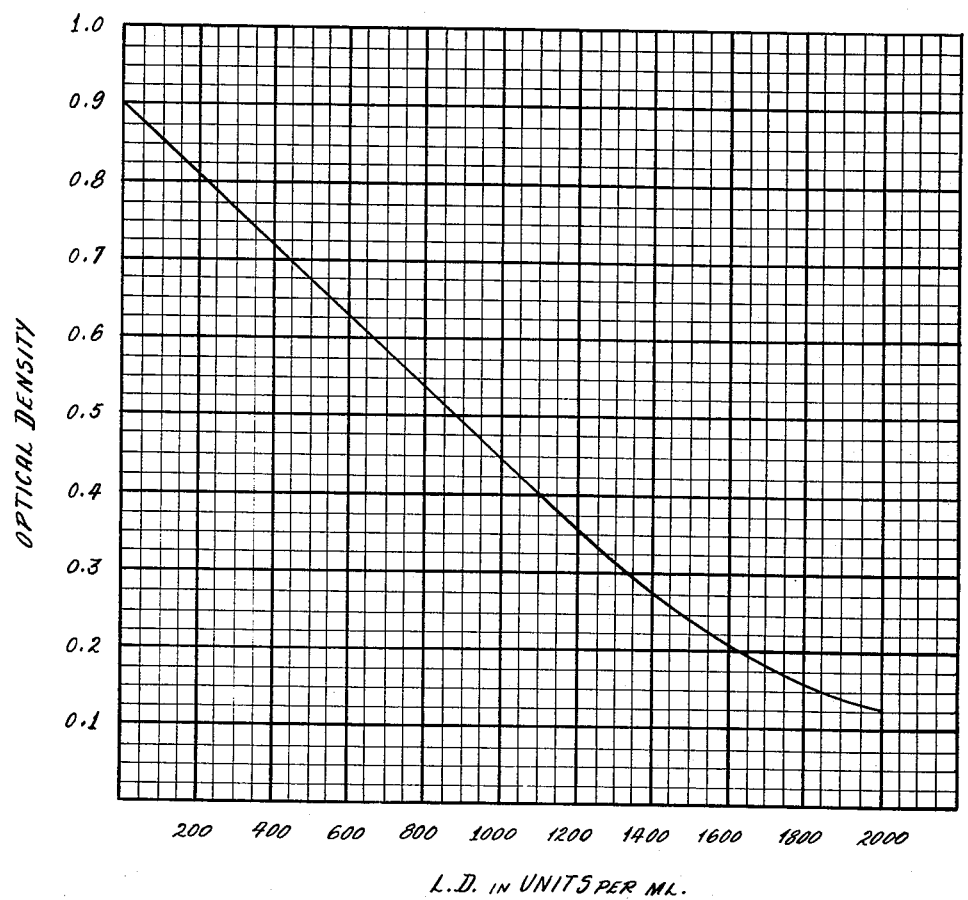
INVENTORS:
DAN BROIDA
LOUIS BERGER
BY
ATTORNEY.

United States Patent Office 2,996,436
Patented Aug. 15, 1961

2,996,436
PROCESS FOR THE COLORIMETRIC DETERMINATION OF LACTIC DEHYDROGENASE
Dan Broida and Louis Berger, St. Louis County, Mo., assignors to Sigma Chemical Company, St. Louis, Mo., a corporation of Missouri
Filed June 2, 1958, Ser. No. 739,191
4 Claims. (Cl. 195—103.5)

This invention relates to the measurement of lactic dehydrogenase in serum or other fluids.

A number of investigators have suggested that the level of serum lactic dehydrogenase, referred to hereafter as LD, is a significant index in the diagnosis of an infarction, particularly a myocardial infarction. Hill and Levi (Cancer Rsch., vol 14, No. 7, 5133, demonstrated a possible relationship between serum LD and leukemia.

Unfortunately, the procedures for measuring LD, known heretofore, require an ultraviolet spectrophotometer and a great deal of technical skill. These requirements have deterred the study of the significance of LD concentration.

The methods of White (New Eng. J. Med., Nov. 22, 1956), and Wroblewski and La Due (Proc. Soc. Exptl. Biol. & Med. 90: 210), involved the measurement of the change in optical density of dihydro diphospho pyridine nucleotide (DPNH; reduced cozymase) resulting from its reaction with pyruvic acid adjusted to a certain pH with alkali, when catalyzed with LD. DPNH has a peak absorption or optical density at 340 mu. The optical density of the DPNH decreases rapidly on either side of the 340 peak, which accounts for the necessity of an ultraviolet spectrophotometer.

In the White process, 0.0033 mol of pyruvic acid and 0.000085 mol of DPNH are used, at a pH of 7.8. The optical density is measured initially, the reaction mixture is incubated for 3 minutes at 38° C., and the decrease in optical density is taken as the measure of concentration of the LD.

In the Wroblewski and La Due procedure, which has heretofore been most widely used, 0.00077 mol of pyruvic acid and 0.0001 mol DPNH are reacted at pH 7.4, at 25° C. The difficulty with the Wroblewski and La Due procedure, in addition to the requirement for an ultraviolet spectrophotometer lies in the fact that the optical density must be determined at regular intervals, generally half-minute intervals, to measure the rate of decrease of the optical density. The measurement itself is not hard, but the temperature of the reactants must be maintained constant, which is a matter of considerable practical difficulty, since the heat from the spectrophotometer tends to raise the temperature of the reactants, hence to speed the reaction.

One of the objects of this invention is to provide a method of accurately measuring lactic dehydrogenase using simple techniques and simple and inexpensive equipment.

Another object of this invention is to provide such a method of measuring LD colorimetrically in such a way that a relatively wide range of wave lengths and of concentrations of the reactants may be employed.

Other objects will become apparent to those skilled in the art in the light of the following description.

In accordance with this invention, generally stated, a method of measuring lactic dehydrogenase is provided in which advantage is taken of the fact that LD catalyzes a reaction involving pyruvate ion, wherein the amount of pyruvate ion consumed is dependent upon the amount of LD present. A precisely known amount of pyruvate is used, and after a given length of time the amount of pyruvate ion remaining is determined colorimetrically. The amount of pyruvate ion consumed is a function of the amount of LD present, so that the amount of LD present can be immediately determined.

The term "pyruvate" is used herein to indicate a source of pyruvate ion. Such a source may be pyruvic acid or a pyruvic acid salt, in either case with the pH properly adjusted. In the illustrative example hereinafter given, the pH is adjusted to about 7.5.

In particular, known amounts of pyruvate and DPNH are mixed, in the presence of a known volume of solution containing an unknown concentration of LD. After a precisely determined period of time, the reaction is stopped, and the pyruvate ion remaining is reacted with a suitable hydrazine, such as 2,4-dinitrophenylhydrazine, to form an intensely colored hydrazone. The optical density or transmission of the hydrazone is then determined, and the LD concentration is determined by reference to a simple chart.

To prepare a typical chart, which is simply a calibration curve or a particular colorimeter at a particular wave length, the optical density or transmission of the hydrazone resulting from various concentrations, within the expected range, of pyruvate, are plotted. The equivalent lactic dehydrogenase units per ml. under the conditions of the test procedure hereafter described, for various concentrations of pyruvate, are indicated in the following table:

| ml. 0.00080 molar sodium pyruvate, at pH 7.5 | ml. water | Equiv. to Berger-Broida Lactic Dehydrogenase units/ml. |
|---|---|---|
| 1.0 | 0.1 | 0 |
| 0.8 | 0.3 | 289 |
| 0.6 | 0.5 | 640 |
| 0.4 | 0.7 | 1,040 |
| 0.2 | 0.9 | 1,530 |
| 0.1 | 1.0 | 2,000 |

The Berger-Broida units are arbitrary measures of LD activity, but under the conditions set out hereafter, they are comparable with Wroblewski units. Other arbitrary units may be used in place of the Berger-Broida units.

As an example of a method of preparing a calibration curve, six samples of sodium pyruvate solutions can be made up as indicated in the above table. To each of the samples, 1 ml. of standardized 2,4-dinitrophenylhydrazine is added. The samples are left at room temperature, 25°±5° C. for 20 minutes after the 2,4-dinitrophenylhydrazine has been added. Promptly at the end of the 20 minute period, 10 ml. of 0.4 N sodium hydroxide are added to each sample, and mixed well therewith. Five minutes after the sodium hydroxide has been added, the optical density or transmission of each sample is measured, against water as a reference. Preferably, the wave length used is such as to result in an optical density (O.D.) of approximately 0.9 (12% transmission) for the first sample, i.e. the sample containing 1.0 ml. sodium pyruvate, 0.1 ml. water. This, however, is not necessary, and the wave length may be increased or decreased to a convenient setting; however, it is desirable to select a setting which will give as high an O.D. as possible within the readable range of the instrument, for the greatest possible latitude.

It can be seen that in the actual determination of LD activity, the final optical density of the solution will be an inverse function of the LD activity, since the greater the amount of LD activity, the less pyruvate ion will remain. Therefore, where high LD activity is to be measured, and the spectrophotometer or colorimeter used is less accurate at very high and very low O.D.'s than in the middle range, it may be desirable to select a wave length which gives an O.D. for the first calibration sample greater than would normally be used, i.e. one which is too great to be measured with great precision, so that the test results will be more nearly within the middle range. Conversely, where very low LD activity is anticipated, the wave length selected may be such as to give a lower initial O.D. than would be used under normal conditions so that the resultant O.D. will lie in the middle, easily read, range. The operative wave lengths lie in the range of about 400 to 550 mu. Once chosen, however, the idential wave length must be used for the entire calibration and for future LD determinations based upon the calibration curve for the chosen wave length. The optical density (or percent transmission) versus the corresponding units of LD are plotted on ordinary graph paper. FIGURE 1 is a typical calibration curve. In FIGURE 1, the optical densities were determined at 525 mu in a Coleman, Jr., colorimeter, in 19 mm. tubes. A practically identical curve resulted when the optical densities were determined in a Beckman DU spectrophotometer, in 10 mm. curvettes, at 464 mu.

In accordance with one illustrative example of the method of this invention, one mg. of dihydro diphospho pyridine nucleotide, in dry form, is placed in a vial. One ml. of 0.00080 molar sodium pyruvate is pipetted into the vial, and the vial is placed into a water bath at 37° C. for a few minutes to warm the reagents. Other temperatures may be used, provided a suitable temperature correction is applied to the plotted transmission curve. Higher temperatures lead to a lower reading because of the increased activity of LD and vice versa.

0.10 ml. of diluted serum (1 part of serum to 5 parts of water) are added to the vial; the contents are shaken gently; a timer is started, and the vial is replaced in the water bath.

Exactly thirty minutes after the diluted serum is added, 1.0 ml. of standardized 2,4-dinitrophenylhydrazine solution (1 millimol per liter in 1 N HCl) is added. The solution is shaken well by swirling, the vial is removed from the water bath and left at room temperature. Twenty minutes after the 2,4-dinitrophenylhydrazine is added, 10 ml. of 0.4 N sodium hydroxide are added, the solution is shaken well by inversion, and transferred to a curvette. Five minutes thereafter, the optical density or transmission of the solution is read at the wave length at which the calibration curve for the instrument to be used was prepared.

The lactic dehydrogenase activity is determined directly from the chart.

If a value greater than 2,000 units per ml. is obtained, it is recommended that the test be repeated, using a further proportional dilution of the diluted serum. The new value obtained from the calibration curve, multiplied by the appropriate dilution factor, will be the correct answer in units per ml. Undiluted serum may be used for low values of LD, and the units in column three of the table adjusted accordingly.

It can be seen that it is absolutely essential that the various reagents be standardized, if consistent results are to be obtained. However, when the reagents are standardized properly, the gross optical density resulting from the enzymatic reaction can be measured accurately and consistently without frequent recalibration of the colorimeter or spectrophotometer. If a suitable reagent blank is run, less accurate solutions may be used, but the resulting deviations must be corrected for.

In the illustrative example given, which is the preferred embodiment of method of this invention, it will be noted that the pyruvate concentration was .0008 molar while the initial DPNH concentration was .00116 molar. While the reaction, which is believed to be a conversion of the pyruvate to lactic acid and of DPNH to diphospho pyridine nucleotide (DPN), would appear to call for a mol to mol ratio of pyruvate to DPNH, the excess DPNH tends to drive the reaction toward completion. The pyruvate concentration can be reduced to .0002 molar and DPNH concentration to .0003 molar and still be operative in accordance with the present method. However, this would reduce the effective range of LD activities available, without further dilution of the enzyme. At those lower concentrations, the optical density is read at a wave length which will give a relatively high O.D. The pyruvate-2,4-dinitrophenylhydrazine reaction product has its peak optical density at 440 mu. The pyruvate concentration can also be increased from the .0008 molar of the illustrative embodiment up to that point at which the color developed exceeds the range of the spectrophotometer used. Any change in the concentration of the pyruvate or in the dilution of the serum will require a corresponding change in the calibration curve.

The optical density can be increased by adding a lesser volume of sodium hydroxide. For example, instead of adding 10 cc. of .4 N NaOH, 5 cc. of .8 N NaOH can be added. This, of course, also involves using a different calibration curve, since the calibration curve used in connection with the preferred method is based upon a particular volume of solution. This expedient might be necessary when the amounts of LD are exceptionally high. The concentration of NaOH at any volume can be varied somewhat.

The concentration of the 2,4-dinitrophenyl-hydrazine is not critical as long as it is constant and sufficient to react with all of the remaining pyruvate, and as long as the total volume is taken into consideration in the calibration. Other suitable hydrazines may be used, such, for example, as 3-quinolylhydrazine, but a separate calibration chart must be prepared for each of them.

As has been indicated heretofore, when low LD activity is to be measured, the serum may be undiluted, or diluted less than the 1–6 dilution of the example. For even lower activities the incubation time may be increased to permit more pyruvate consumption, or the temperature may be raised, or both expedients employed. A change in temperature, however, requires a new or "corrected" calibration chart. When the standard temperature is used with a longer incubation time, it has been found that the rate of reaction appears fairly steady, so that, for example, an undiluted serum incubated for two hours may have about one twenty-fourth the activity indicated on the standard (1–6 dilution, thirty-minute period) calibration chart, for the O.D. obtained. In practice, a careful initial control should be run, with the particular equipment to be employed, however, rather than simply to assume that all of the rate elements of the reaction are going to be linear.

Similarly, in the case of high LD activity, a shorter reaction time can be used. However, as the reaction time is shortened, the percentage errors become greater with slight inaccuracies in time.

The time periods given in the preferred embodiment are not all as critical as the period between the time the serum is added and the time the color reagent is added. That interval is important. The following step, the addition of the sodium hydroxide after the 2,4-dinitrophenylhydrazine has been added, must be delayed at least ten minutes, but it could be delayed as much as one hour. That is to say, there is a minimum period, under the circumstances set out in the example, of ten to fifteen minutes, the indicated twenty-minute waiting period being simply a convenient and safe interval. After the sodium hydroxide has been added, and the solution shaken, the color is fully developed in approximately five minutes. However, the color remains stable for at least an hour.

The lactic dehydrogenase used in the example was described as serum LD. The same procedure may be used with extracts of spinal fluid, yeast, bacteria, plants, tissues, or any other fluid containing LD.

The pH of the solution may be adjusted to suit the worker who is interested in LD activities at a pH different from 7.5. However, it has been discovered that LD activity may vary markedly with different pH's, and that a change in pyruvate concentration at some pH's may change the activity of the LD so that, for example, as the concentration of pyruvate goes down in the course of the process, its rate of reaction may vary so that the reaction will be decidedly non-linear with time. In the illustrative embodiment of the process described, this problem is not manifest. Under different conditions, as has been pointed out heretofore, it will be necessary to recalibrate the curve in terms of the units at a given optical density.

While the correlation of the LD units with disease does not constitute a part of this invention, it is of interest to note that the investigators have found that normal values of approximately 165 to 332 Berger-Broida units/ml. serum (determined by the method of this invention) can be expected, while in cases of myocardial infarction, the maximum values lie between 340 and 4,000 units/ml. Elevated values, ranging from approximately 350 to 1,000 units/ml. were reported for heptocellular necrosis; metastatic carcinoma, diabetic ketosis, infectious mononucleosis, and cerebral infarction.

Having thus described the invention, what is claimed and desired to be secured by Letters Patent is:

1. The process of measuring lactic dehydrogenase concentration colorimetrically, comprising mixing a known quantity of pyruvate ion, in a known volume of solution, and a known quantity of dihydro diphospho pyridine nucleotide, with a known volume of solution containing an unknown concentration of lactic dehydrogenase; reacting the pyruvate and dihydro diphospho pyridine nucleotide for an accurately determined length of time at a controlled temperature; adding a known volume of a hydrazine capable of reacting with all of the pyruvate to form a colored hydrazone, developing the color, and determining the optical density of the solution at a given wave length of light.

2. The process of measuring lactic dehydrogenase concentration comprising mixing a known quantity of dihydro diphospho pyridine nucleotide with a known volume of solution containing a known quantity of pyruvate ion; adding a known volume of solution containing an unknown concentration of lactic dehydrogenase; reacting the pyruvate ion and dihydro diphospho pyridine nucleotide for a given, accurately determined length of time at a controlled, known temperature; then adding sufficient 2,4-dinitrophenylhydrazine in a known volume of solution to react with all of the pyruvate ion, adding, after a length of time sufficient to permit the completion of reaction of the pyruvate ion and 2,4-dinitrophenylhydrazine, alkali, permitting the color to develop, and measuring the optical density of the solution at a given wave length of light.

3. The process of measuring lactic dehydrogenase concentration colorimetrically comprising mixing a known quantity of dihydro diphospho pyridine nucleotide, in dry, stabilized form, with a known volume of solution containing a known quantity of sodium pyruvate; adjusting the temperature of the solution; adding a known volume of solution containing an unknown concentration of lactic dehydrogenase; reacting the pyruvate and dihydro diphospho pyridine nucleotide at a controlled temperature for an accurately determined length of time; thereupon adding sufficient 2,4-dinitrophenylhydrazine to react with all of the pyruvate ion; after a length of time sufficient to ensure the reaction of the 2,4-dinitrophenylhydrazine with all of the remaining pyruvate, adding alkali, permitting color to develop fully, and measuring the optical density of the solution at a given wave length of light.

4. The process of measuring lactic dehydrogenase concentration colorimetrically, comprising reacting pyruvate ion with dihydro diphospho pyridine nucleotide in the presence of an unknown concentration of lactic dehydrogenase, at a known temperature, for a known time, and in a known volume of solution, the initial amount of pyruvate ion being known, and thereafter determining colorimetrically the amount of unreacted pyruvate ion.

References Cited in the file of this patent

Price et al.: Biochem. Prep., 2, 1952, pp. 18–22.
Colowich and Kaplan: Methods in Enzymology, Academic Press Inc., New York, vol. II (1955), pp. 729–730, III (1957), pp. 413–418.
Korkes: "Methods in Enzymology," vol. II, pp. 729 and 730 (1955).